United States Patent
Carey

(10) Patent No.: US 12,120,991 B2
(45) Date of Patent: Oct. 22, 2024

(54) LIQUID FLOW CONTROLLER FOR ANCILLARY SPAN ZONES

(71) Applicant: Reinke Manufacturing Co., Inc., Deshler, NE (US)

(72) Inventor: Josiah John Carey, Deshler, NE (US)

(73) Assignee: REINKE MANUFACTURING CO., INC., Deshler, NE (US)

( * ) Notice: Subject to any disclaimer, the term of this patent is extended or adjusted under 35 U.S.C. 154(b) by 919 days.

(21) Appl. No.: 17/179,112

(22) Filed: Feb. 18, 2021

(65) Prior Publication Data

US 2022/0256787 A1 Aug. 18, 2022

(51) Int. Cl.
*A01G 25/09* (2006.01)
*A01G 25/16* (2006.01)
*G01B 21/28* (2006.01)

(52) U.S. Cl.
CPC ......... *A01G 25/092* (2013.01); *A01G 25/165* (2013.01); *G01B 21/28* (2013.01)

(58) Field of Classification Search
CPC .......................... A01G 25/092; A01G 25/165
See application file for complete search history.

(56) References Cited

U.S. PATENT DOCUMENTS

| 2010/0032493 | A1* | 2/2010 | Abts | A01G 25/092 |
| | | | | 239/11 |
| 2018/0054982 | A1* | 3/2018 | Whalley | A01G 25/16 |

* cited by examiner

*Primary Examiner* — Mark A Connolly
(74) *Attorney, Agent, or Firm* — Shook, Hardy & Bacon L.L.P.

(57) ABSTRACT

Aspects of the disclosure provide systems and methods for controlling the flow of water through zones of an ancillary span of an irrigation system to achieve optimal water distribution for each of a plurality of sections of a field-of-interest to be irrigated by the ancillary span. The disclosed systems and methods optimally turn control zones on and off to minimize the flow variability of water supplied to the ancillary span. The technology described herein runs a series of simulations to determine an optimal irrigation plan for the ancillary span. The instantaneous average flow at different points within a simulation may be calculated. The plurality of instantaneous average flows are used to determine a variance statistic for the plurality, which is used to determine the optimal plan.

20 Claims, 12 Drawing Sheets

| Coordinate | | |
|---|---|---|
| Zone 11 Area Factor | Area in sq. ft | Area Factor Percentage |
| Section 48 (Prime Section) | 24,000 | 100% |
| Section 49 | 23,980 | 99.9% |
| Section 50 | 22,001 | 91.7% |
| Section 110 | 10,852 | 45.2% |

*FIG. 9.*

LIQUID FLOW CONTROLLER FOR ANCILLARY SPAN ZONES

TECHNICAL FIELD

The present disclosure generally relates to irrigation equipment and, more particularly, to center pivot irrigation systems which are provided with an ancillary span (i.e., swing arm), wrap span, or the like attachment for irrigating corner areas of fields. The present disclosure further relates to systems and methods for optimizing the scheduling of water distribution from zones of ancillary spans, wrap spans, or the like in center pivot irrigation systems.

BACKGROUND

The following discussion of the background of the disclosure is intended to facilitate an understanding of the present disclosure. However, it should be appreciated that the discussion is not an acknowledgement or admission that any of the referenced material was published, known, or part of the common general knowledge as of the priority date of the application. Some embodiments of the disclosure are described herein with reference to irrigation equipment, machines and/or systems. However, it will be understood and appreciated by those having ordinary skill in the art that embodiments of the disclosure are not limited to irrigation system applications and may be used in other applications where optimizing liquid distribution within a bounded area would be beneficial.

Mechanized irrigation systems provide the ability to manage water resources and, in some instances, other liquids. For example, mechanized irrigation systems can enable application of an optimal amount of water at critical times during a crop's life cycle, fortifying crop health and maximizing yield potential. While there are many components that make up mechanized irrigation systems, in a general sense, such systems include a mechanical structure, a drivetrain, and a control system. One common type of mechanized irrigation system is a center pivot arrangement that includes a central pivot point about which the system rotates, swivels, or revolves. The central pivot point generally includes a rotational swivel and bearing assembly that supports a substantially horizontal, primary, irrigation pipeline having one or more spans. A "span," as the term is used herein, is a structural assembly comprised of at least a portion of the substantially horizontal, primary, irrigation pipeline, struts and braces, and a truss rod connection system. A span travels in a fixed circular operation in relation to the central pivot point. The path of travel is determined by the span's radial position with respect to the central pivot point. Hence, the particular area capable of being irrigated by a span can be ascertained through standard mathematical calculations known to those having ordinary skill in the art. This, in turn, permits optimal water capacity or distribution to be determined.

Although central-pivot-type irrigation systems function satisfactorily for the most part, they are capable of watering only circular areas. Most plots of land, however, are not circular in shape, but are of some other shape, the most common of which is square. A basic central pivot machine is not able to irrigate the corner areas of square or rectangular fields or other areas outside of the circle covered by the machine. Accordingly, various types of attachments have been proposed to more adequately cover the sizeable land area represented by field corners. One successful type of corner irrigation system incorporates an ancillary span or swing arm which is added onto an outermost end of a primary irrigation pipeline. (It will be understood throughout this patent that reference to the term "ancillary span" is intended to incorporate not only ancillary spans but wrap spans and the like as well.)

An ancillary span is generally similar in construction to the spans of the primary irrigation pipeline, except that it has a hinge connection with the outermost end (relative to the central pivot point) of the primary irrigation pipeline and is supported by a tower having steerable wheels (i.e., a steering tower or S-tower). As the primary irrigation pipeline turns about the central pivot point, the steering tower is able to pivot the ancillary span out into the corners of the field and to retract the ancillary span back behind (or in front) of the primary irrigation pipeline as the system departs from a corner. In this manner, the ancillary span provides controllable and moveable extension to the primary irrigation pipeline which is able to cover a substantial portion of each corner of the field.

Determining optimal water capacity for irrigation systems incorporating ancillary spans is much more complex than performing the standard mathematical calculations for determining optimal water capacity for a circular area covered by a primary irrigation pipeline. This is due in part to the ability of the ancillary span to maneuver at different extension and retraction velocities independent of the primary irrigation pipeline. Thus, many prior-proposed and/or existing irrigation systems incorporating an ancillary span fail to apply water in a uniform manner to the corners of the field. As the ancillary span extends out into a field corner, it travels faster than the primary irrigation pipeline; thus, under-watering can occur in the area covered by the ancillary span during its extension. Conversely, the ancillary span moves relatively slowly as it retracts out of the field corners; thus, over-watering can occur in the areas covered by the ancillary span as it folds back behind the primary irrigation pipeline. The overall result is that some areas near the field corners may be under-watered and other areas may be over-watered, and the effectiveness of the irrigation suffers accordingly.

Another issue that makes determining optimal water capacity for ancillary spans more complex when compared to a primary irrigation pipeline is that the orientation of the ancillary span as it passes over the area to be irrigated is not constant. The uniformity of the water distribution accordingly suffers due to the changes that occur in the effective overall length of the irrigation system as the ancillary span extends out and then retracts back in. Stated differently, when the ancillary span is in its most retracted orientation with respect to the primary irrigation pipeline, a substantial length of the ancillary span may pass over the same point on the ground below the ancillary span. Conversely, when the ancillary span is at its most extended orientation, only the width of the pipeline may pass over a point on the ground. Accordingly, in order to distribute water evenly, it is necessary to supply water to the machine at varying rates (because more water is required when the machine is operating at its maximum length than when it is at minimum length) or to activate and deactivate select sprinklers to control the amount of water being distributed from particular portions of the primary irrigation pipeline and/or the ancillary span at various times throughout the irrigation cycle.

These problems may be solved, in part, by controlling water flow on a zone-by-zone basis across the ancillary span to deliver an optimal amount of water to each sector as the ancillary span traverses the sector. Because of the geometry of the area irrigated by the ancillary span, zones of the span will irrigate different sized area at different portions of the irrigation process. The sprinkler heads installed on a zone of the ancillary span need to be a large enough size to deliver the assigned amount of water to the largest area it will cover. This means the sprinkler heads will be oversized for some smaller irrigation areas. In one aspect, this excess capacity is handled by intermittent operation of the sprinkler heads on a zone-by-zone basis. The intermittent operation can result in a highly variable amount of water flowing through the ancillary span at different times. In some cases, a system's water infrastructure, such as a pumping station, cannot handle a variable instantaneous flow rate caused by the zone-by-zone control of water flow in the ancillary span. Accordingly, there is a need for a zone controller that minimizes the variability of water flow through the ancillary span.

It should also be noted that some center pivot systems enable variable flow to different spans, apart from, or in addition to, variable flow in an ancillary span. The same variable flow problems common in ancillary spans may be found in center pivot systems with variable flow control. Obtaining consistent average flow can also be a problem within laterally moving irrigation systems that employ variable flow.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Aspects of the disclosure provide systems and methods for controlling the flow of water through zones of an ancillary span of an irrigation system to achieve optimal water distribution for each of a plurality of sections of a field-of-interest to be irrigated by the ancillary span. The technology described herein can also control the flow in center pivot systems that enable variable flow to different spans, apart from, or in addition to, variable flow in an ancillary span. The flow control technology can also be used to schedule irrigation flows in laterally moving irrigation systems that employ variable flow. The specification will primarily describe the flow control technology in the context of an ancillary span, but the flow control technology described herein is not limited to use with an ancillary span.

The disclosed systems and methods optimally turn control zones on and off to minimize the flow variability of water supplied to the ancillary span.

The technology described herein runs a series of simulations to determine an optimal irrigation plan for the ancillary span. The optimal irrigation plan is an arrangement of starting and stopping times within a duty cycle for different control zones of the ancillary span. The duration of run time for each control plan is an input to the simulation and is calculated based on needs of the crop being irrigated. The simulation does not change prescribed run duration for a control zone or the overall water provided. The simulation determines when the water should be provided in different control zones to minimize variability.

As an initial step, a preliminary cascading arrangement may be simulated. The cascading arrangement is a sequential arrangement of control zones where a running control zone is turned off before a subsequent control zone starts. The control zones are started in an order based on the total percentage of water applied by the ancillary span that is attributable to the control zone. Thus, the control zone with the largest percentage of water will start first and the control zone with the smallest percentage of water will go last.

The instantaneous average flow at different points within the preliminary cascading arrangement simulation may be calculated. For example, an instantaneous average flow could be calculated every second. The plurality of instantaneous average flows are used to determine a variance statistic for the plurality. In one aspect, an acceptance threshold is used to determine whether to simulate more arrangements or accept a present simulation. If the variance statistic calculated for a simulation's instantaneous average flows meets an acceptance threshold, then the preliminary cascading arrangement may be accepted as the final model and no further simulations run. On the other hand, if the variance statistic does not satisfy the acceptance threshold then additional simulations are run until a simulation is found that satisfies the acceptance threshold. If no simulation produces an arrangement that meets the acceptance threshold then the simulation that produces the best variance statistic may be accepted.

BRIEF DESCRIPTION OF THE DRAWINGS

Aspects of the disclosure are described in detail below with reference to the attached drawing figures, wherein:

FIG. 9 illustrates an exemplary area factor chart in accordance with aspects of the disclosure;

DETAILED DESCRIPTION

Figure 1:
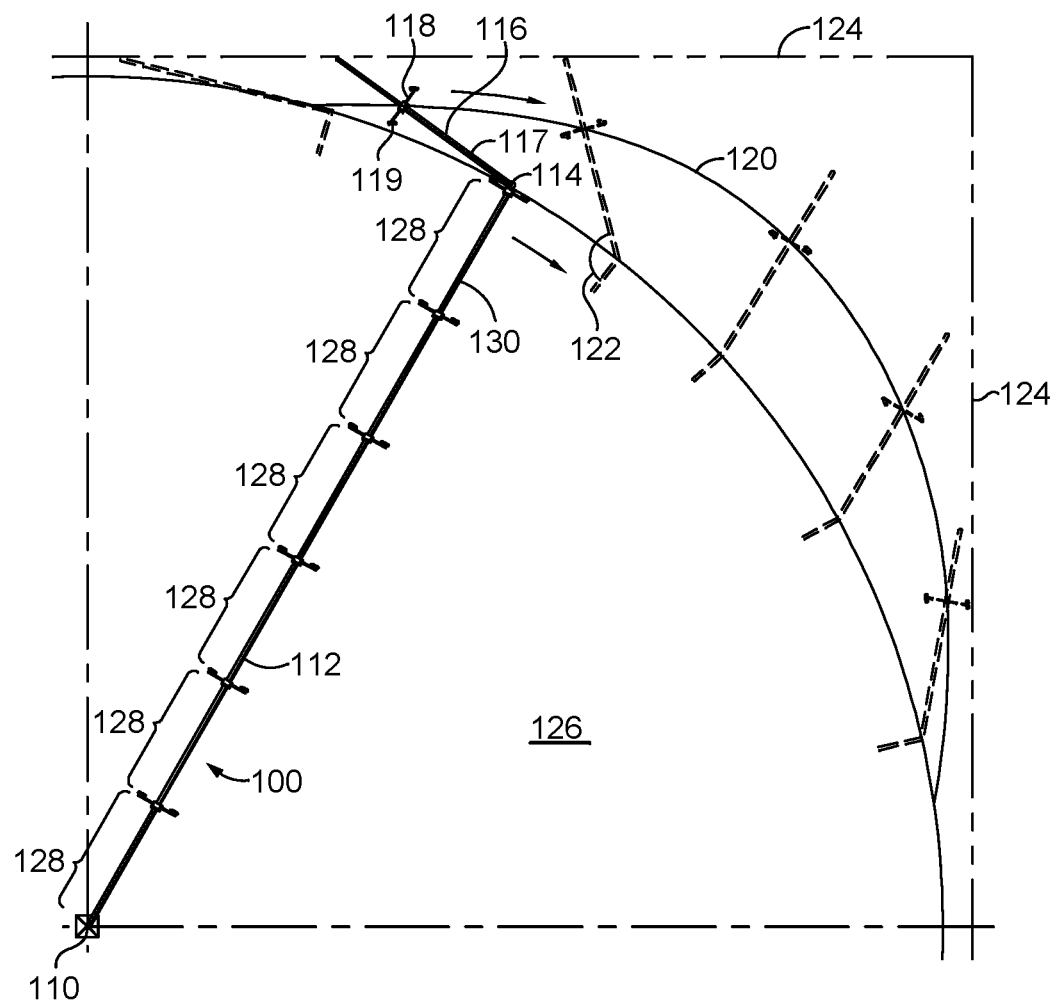
FIG. 1 is a schematic plan view of a center pivot irrigation system with an ancillary span operating in a corner of a field in accordance with an embodiment of the present disclosure.

The subject matter of aspects of the present disclosure is described with specificity herein to meet statutory requirements. However, the description itself is not intended to limit the scope of this patent. Rather, the inventors have contemplated that the claimed subject matter also might be embodied in other ways, to include different components, steps, or combinations of components and/or steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the disclosure provide systems and methods for controlling the flow of water through zones of an ancillary span of an irrigation system to achieve optimal water distribution for each of a plurality of sections of a field-of-interest to be irrigated by the ancillary span. The technology described herein can also control the flow in center pivot systems that enable variable flow to different spans, apart from, or in addition to, variable flow in an ancillary span. The flow control technology can also be used to schedule irrigation flows in laterally moving irrigation systems that employ variable flow. The specification will primarily describe the flow control technology in the context of an ancillary span, but the flow control technology described herein is not limited to use with an ancillary span. The disclosed systems and methods optimally turn control zones on and off to minimize the flow variability of water supplied to the ancillary span.

The technology described herein runs a series of simulations to determine an optimal irrigation plan for the ancillary span. The optimal irrigation plan is an arrangement of starting and stopping times within a duty cycle for different control zones of the ancillary span. The duration of run time for each control plan is an input to the simulation and is calculated based on needs of the crop being irrigated. The simulation does not change prescribed run duration for a control zone or the overall water provided. The simulation determines when the water should be provided in different control zones to minimize variability.

As an initial step, a preliminary cascading arrangement may be simulated. The cascading arrangement is a sequential arrangement of control zones where a running control zone is turned off before a subsequent control zone starts. The control zones are started in an order based on the total percentage of water applied by the ancillary span that is attributable to the control zone. Thus, the control zone with the largest percentage of water will start first and the control zone with the smallest percentage of water will go last.

The instantaneous average flow at different points within the preliminary cascading arrangement simulation may be calculated. For example, an instantaneous average flow could be calculated every second. The plurality of instantaneous average flows are used to determine a variance statistic for the plurality. Example variance statistics include, but are not limited to, range (i.e., the difference between the highest and lowest values), interquartile range (i.e., the range of the middle half of a distribution), standard deviation (i.e., average distance from the mean) and variance (average of squared distances from the mean). As an example, a small standard deviation will indicate low variability, while a comparatively large standard deviation will indicate high variability among the data set.

In one aspect, an acceptance threshold is used to determine whether to simulate more arrangements or accept a present simulation. If the variance statistic calculated for a simulation's instantaneous average flows meets an acceptance threshold, then the preliminary cascading arrangement may be accepted as the final model and no further simulations run. On the other hand, if the variance statistic does not satisfy the acceptance threshold then additional simulations are run until a simulation is found that satisfies the acceptance threshold. If no simulation produces an arrangement that meets the acceptance threshold then the simulation that produces the best variance statistic may be accepted.

Other triggers may be used instead of, or in addition to, the acceptance threshold. For example, when the total percentage of run time of all control zones totals to over 300%, 400%, 450%, or some other trigger criteria then multiple simulations using different arrangement models are run.

The input to the simulation is a sector watering plan for each sector being irrigated by the ancillary span. A sector is a portion of a field being watered. The sector water plan specifies the amount of water to be applied in each control zone of the ancillary span. In one aspect, the sector watering plan specifies a percentage runtime for a control zone during a duty cycle. The percentage runtime is the amount of time it takes to output the specified amount of water from the control zone divided by the total amount of time in a duty cycle.

Aspects of the invention will be described in terms of zone flow control. A zone, as the term is utilized herein, is a defined area of a field. In an aspect, the area of the field may be an area of a field running between a beginning distance or radius and an ending distance or radius, each distance/radius being determined based upon a distance from the central pivot point of the irrigation system. For instance, a zone may begin at 451 feet from the central pivot point and end at 523 feet from the central pivot point. In this example, water is supplied to the zone by the portion of the irrigation system that operates above the zone. Roughly speaking, the portion of the irrigation system between 451 feet and 523 feet will include irrigation nozzles that supply water to the zone. As used herein, a control zone is a portion of the irrigation system, including nozzles, that supply water to the zone. Controlling the water provided to the zone is described as zone control and occurs by opening and closing valves to the nozzles in the control zone that provide water to the corresponding zone of the field.

Zones may be broken down into sectors. Sectors are a defined area containing a start and end angle corresponding to the swiveling center. For example, a sector may start at 30 degrees and end at 30.1 degrees.

A section is a portion of field delineated by zone boundaries and sector boundaries. For example, the area (typically a quadrilateral) bounded by a zone boundary (e.g., length of span) on two sides and sector boundaries (e.g., from 30.1 to 30.2) on the other two sides forms a section. These boundaries are mathematical and need not actually be delineated in a physical way (e.g., with a fence or other observable marker) in the field. In aspects, an irrigation assignment is calculated for each section.

Sections served by control zones of the main irrigation span remain a nearly constant size as the irrigation system traverses a field during the irrigation process. On the other hand, sections served by control zones of the ancillary span can vary a great deal because of the irregular path traveled by the ancillary span. The ancillary span and corresponding nozzles in a control zone are sized to provide water to the largest section irrigated by the control zone. The largest section served by a control zone may be described as the prime section.

When irrigating the largest zones, the control zone may run "full on" with the valves open the entire duty cycle. On the other hand, when irrigating comparatively small sections, the zone controller will turn irrigation nozzles on and off to make sure overwatering does not occur. If the irrigation system ran "full on" when irrigating smaller sections then damage could result from overwatering and water would also be wasted. This on/off operation may be described as intermittent irrigation.

The technology described herein optimizes the distribution of water to control zones during intermittent irrigation by turning the control zones on and off in a way that minimizes flow variation in the ancillary span. The goal is to approach a constant overall flow through the span as the flow through control zones of the span start and stop.

The irrigation system typically moves slowly with reference to duty cycles. The location will change very little from one duty cycle to the next with areas irrigated in adjacent duty cycles having significant overlap, such as 90% overlap, 95% overlap, or more. The technology described herein uses an irrigation schedule comprising scheduled time on for each control zone during a duty cycle. A duty cycle is a unit of time, such as two minutes. Using two minutes as an example, watering a single section for an hour would comprise 30 duty cycles if traversal of the section by the ancillary span took one hour.

The irrigation schedule can be assigned a percent run-time during a duty cycle. If a control zone had an irrigation assignment of 50% then it would run for 1 minute of every 2 minute duty cycle. Each zone could have a different assignment defined by a percent of duty cycle run time, raw run time, or some other method. Because the irrigation system moves slowly, the irrigation can occur anytime during the duty cycle. For example, the amount of water provided to the field will be the same whether the irrigation occurs in the first half of the duty cycle or the second half.

For the sake of illustration, the detailed description will use an ancillary span with six control zones. Aspects of the technology described herein can be used with any number of control zones and the use of six as an example is not meant to be limiting. To help illustrate with example data, a first control zone could have a 30% runtime, a second control zone could have a 40% runtime, a third control zone could have a 50% runtime, a fourth control zone could have a 55% runtime, a fifth control zone could have a 60% runtime, and a six control zone could have a 70% runtime. In the prior art, all control zones could be started at the same time and essentially turned off one by one as the runtime criteria is satisfied. Using the data given above, this would result in an initial full on for the first 30% duty cycle and then a gradual fall off until all zones are turned off. This control arrangement would results in a maximum variation between 100% operation and 0%. The flow control technology described herein, which generates an optimal arrangement that minimizes flow variation, is described in more detail starting with FIG. 10. FIGS. 1-9 provide background information on irrigation system and a method of calculating an irrigation schedule for a section irrigated by a control zone of an ancillary span. The irrigation plan is input to the novel control technology described herein.

Before describing the flow control system in detail, an understanding of irrigation systems in general and ancillary spans in particular will be helpful. As previously set forth, in center pivot irrigation systems, the irrigation span moves in a fixed circular operation in relation to the center pivot point of the irrigation system. The irrigation span carries the main irrigation pipeline. The path of travel is determined by the radial position of the span relative to the central pivot point. Since the span is a structural assembly and it operates in a constant and known circular path, the area capable of being irrigated by the span can be ascertained through standard mathematical calculations. For an ancillary span, this process is more complex due to the ability of ancillary spans to maneuver at changing orientations and changing extension and retraction velocities independent of the primary irrigation pipeline. Through the use of a predetermined path, however, these maneuvers are predictable and optimal water capacity can be calculated using the methods described in the present disclosure. Once the optimal water capacity is calculated, the flow controller of the methods described herein can deploy the assigned amount of water, while minimizing the overall variability of water supplied across the ancillary span.

Overview of Irrigation System with Ancillary Span

Figure 2:
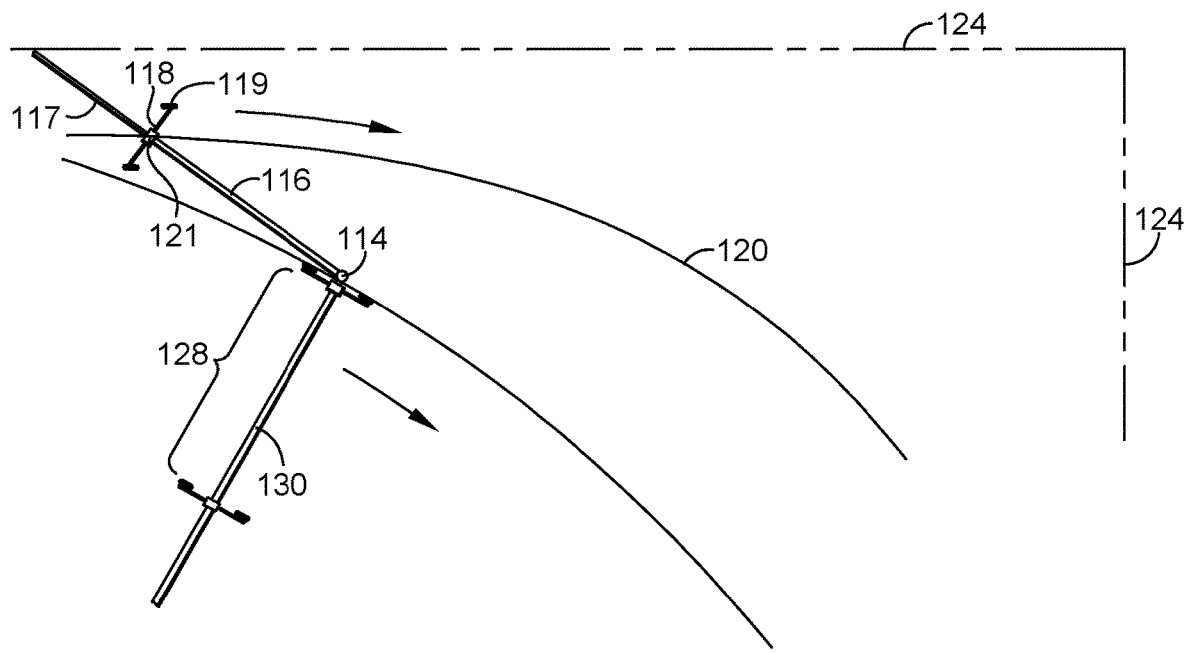
FIG. 2 is an enlarged fragmentary view of the irrigation system of FIG. 1 with the ancillary span in a first location where the ancillary span is just entering the corner and is almost completely trailing the primary irrigation pipeline.
Figure 3:
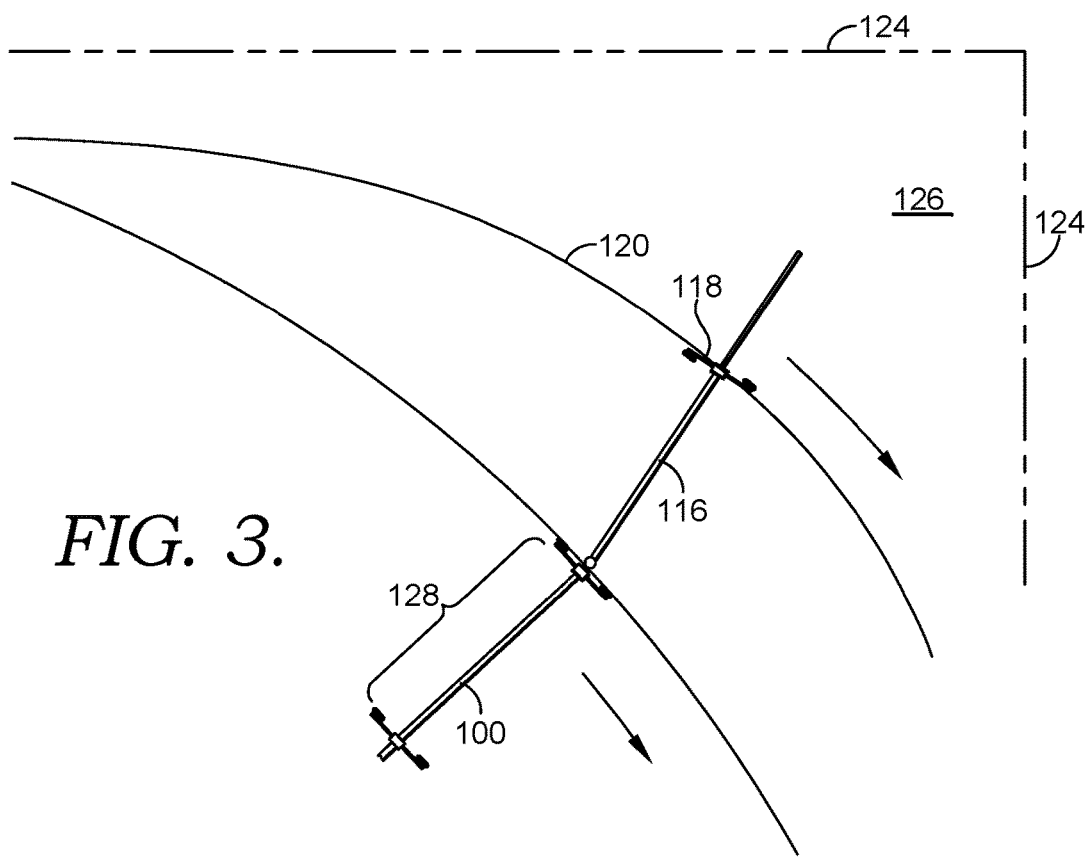
FIG. 3 is an enlarged fragmentary view of the irrigation system of FIG. 1 with the ancillary span in a second location where the ancillary span is at an almost fully extended position with respect to the primary irrigation pipeline.
Figure 4:
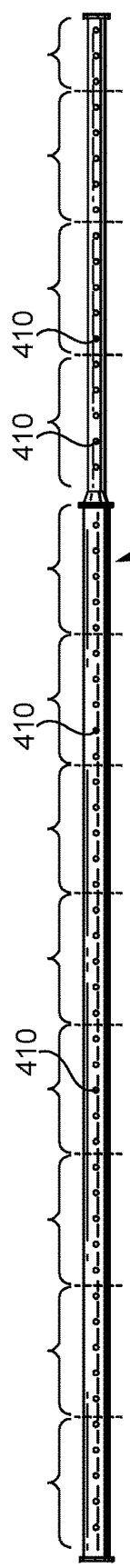
FIG. 4 is a top plan view of a top side of a pipeline of the ancillary span with a plurality of sprinkler outlets thereon, each sprinkler outlet illustrated in an open position in accordance with an embodiment of the present disclosure.
Figure 5:
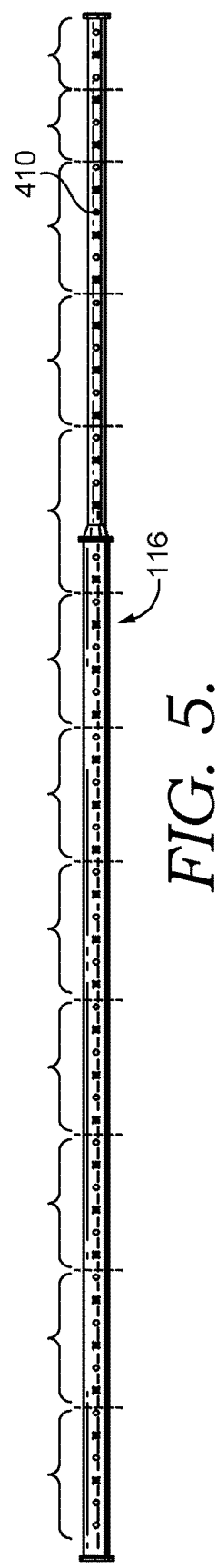
FIG. 5 is the pipeline of FIG. 4 with some of the sprinkler outlets illustrated in a closed position in accordance with aspects of the present disclosure.
Figure 6:
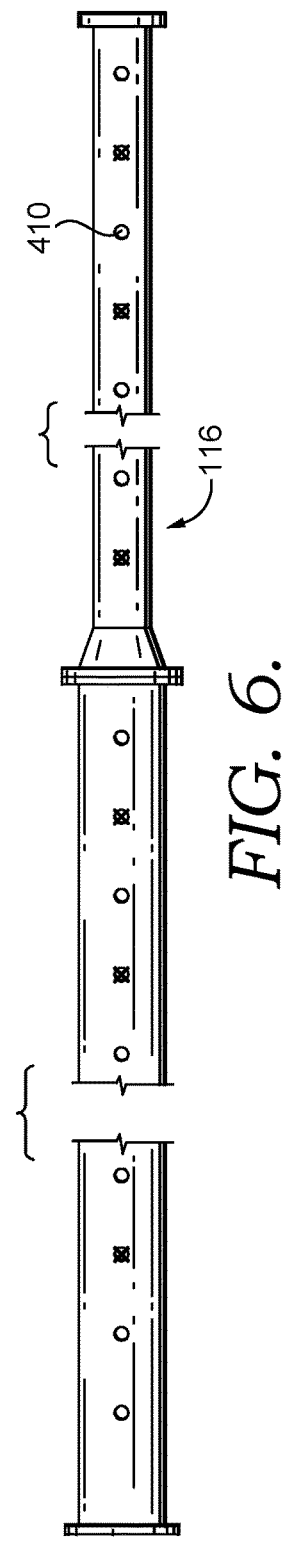
FIG. 6 is an enlarged, fragmentary view of the pipeline of FIG. 5.

With reference to the schematic illustrations of FIGS. 1-3, an irrigation system 100 suitable for performing methods in accordance with embodiments hereof includes a central pivot point 110, about which a primary irrigation pipeline 112 swivels, and a hinge point 114, at which an ancillary span 116 is coupled with a distal end of the primary irrigation pipeline 112. Irrigation systems suitable for performing methods in accordance with embodiments hereof further include a steering tower 118 positioned along the length of the ancillary span 116 at a distance spaced from the hinge point 114. The steering tower 118 of the ancillary span 116 is controllable independently of the central pivot point 110 and/or the primary irrigation pipeline 112. In embodiments, the steering tower 118 includes one or more motors (not shown) and electronic components (not shown) suitable for controlling movement of the ancillary span 116.

The disclosed systems and methods utilize a path of travel 120 determined for the ancillary span steering tower 118. (It is noted that in FIGS. 1-3, only a portion of the path of travel 120 is depicted. This is in no way meant to limit embodiments of the present disclosure.) The area capable of being irrigated by the ancillary span 116 is highly variable due to the number of maneuvers that can be performed by the ancillary span 116. That is, during normal operations, the ancillary span 116 can extend and retract as well as travel at increased and decreased velocities relative to the primary irrigation pipeline 112, even though it is coupled with the primary irrigation pipeline 112 at the hinge point 114. The path of travel 120 for the ancillary span steering tower 118 may comprises a file that includes a plurality of polar coordinates that are referenced from the central pivot point 110. In some embodiments, the path of travel includes 3,600 polar coordinates for a full rotation of the irrigation system.

It should be noted that in the illustrated embodiment and the discussion described herein, the orientation of the steering tower 118 with respect to the pipeline 117 of the ancillary span 116 is fixed and the wheels 119 of the steering tower 118 rotate with respect to the steering tower 118. Consequently, the wheels 119 of the steering tower 118 do not follow in the same path nor do they follow along the path of travel 120, as described herein or illustrated. Instead, the path of travel 120 is the imaginary path along the ground above which a reference point 121 of the steering tower 118 travels. In the illustrated embodiment, the reference point 121 is the center point where the steering tower 118 connects to the ancillary span 116. The location of the reference point 121 relative to the steering tower 118, however, can vary based upon the application. Thus, it is within the scope of embodiments of the present disclosure to have a reference point, or guidance system, anywhere on or about the steering tower 118 (e.g., on a leg of the steering tower 118, proximate to the center of the steering tower 118, on a bracket coupled with the steering tower, or the like). It is further within the scope of embodiments of the present disclosure to have a steering tower where the orientation between the wheels of the steering tower and the steering tower itself is fixed (e.g., like it is on a tower under the principle span of the parent system) and the orientation of the steering tower with respect to the pipeline 117 of the ancillary span 116 is variable (i.e., where the steering tower rotates with respect to the ancillary span). In such an arrangement, the wheels of the ancillary tower could ride in a single path, thereby minimizing crop damage, and the single path could actually be along the path of travel.

In some embodiments, the boundary 124 of the field-of-interest 126 may be determined by geospatial mapping. In some embodiments, geospatial mapping is accomplished through the use of global positioning systems (GPSs) with the output being a file containing coordinates. These coordinates define the boundary 124 of the field-of-interest 126. In some embodiments, a GPS sensor or other suitable geospatial mapping apparatus (not shown) is coupled with the ancillary span steering tower 118. The sensor or other suitable apparatus may be communicatively coupled with one or more computing devices (e.g., servers and/or databases) configured for receiving, interpreting, and storing sensed geospatial data.

It will be understood and appreciated by those having ordinary skill in the art that other methods of capturing the field-of-interest may be utilized. Reference to the illustrative embodiments herein is not meant to limit the scope of embodiments of the present disclosure in any way. Any number of field-of-interest-capturing variations, and any combination thereof, are contemplated to be within the scope of embodiments of the present disclosure.

With the boundary 124 known, the irrigation system is fitted to optimize the area within the mapped boundary that is capable of being irrigated by the primary irrigation pipeline 112. As a result of this optimization process, an optimal location for the central pivot point 110 of the irrigation system is determined. The central pivot point 110 provides the point at which all spans 128 of the primary irrigation pipeline 112, typical and non-typical, are attached through linking the spans 128 together. The spans 128 swivel as a single unit around the central pivot point 110. This causes the spans 128 to travel in a circular operation, representing a circle upon completion of a full operation. During the optimization process and determination of the location of the central pivot point 110, spans 128 are selected to fit within the boundary. The "last span" 130 of the primary irrigation pipeline 112 is the final span in the link of one or more typical spans comprising the primary irrigation pipeline 112.

Utilizing the combination of the field-of-interest boundary 124 and the last span 130 as constraints, an optimal ancillary span 116 is selected such that the ancillary span 116 is capable of irrigating as large an area outside the area covered by the primary irrigation pipeline 112 as possible. The selected ancillary span 116 is coupled with the primary irrigation pipeline 112 at the hinge point 114 located at a distal end of the last span 130 to provide additional coverage in the corners due to the ability of the ancillary span 116 to extend and retract in and out of the field corners and/or around other obstacles through the use of the independently controlled ancillary span steering tower 118.

The selected ancillary span 116 is further optimized by the arrangement of sprinkler nozzles 410 along the length thereof. The sprinkler nozzles 410 are connected to the ancillary span 116 at sprinkler outlets positioned longitudinally along the ancillary span 116. Various arrangements can be seen with reference to the schematic diagrams of FIGS. 4-6. It will be understood and appreciated by those having ordinary skill in the art that different lengths of ancillary spans 116 may be available and/or may become available in the future. As such, the illustrated embodiments are not exhaustive of all possible zone and sprinkler nozzle arrangements but rather are merely illustrative for the purposes of the present disclosure. A plurality of zones and a plurality of sprinkler nozzles may be present on any given ancillary span 116.

In accordance with embodiments of the present disclosure, the sprinkler nozzles 410 are progressively arranged into zones (more fully described below) located linearly and longitudinally along the ancillary span 116.

With reference back to FIGS. 1-3, the result of the optimization of the ancillary span 116 is a path of travel 120 based on the location of the ancillary span steering tower 118 relative to the central pivot point 110 and the angle 122 at the hinge point 114 of the ancillary span 116 relative to the parent system or primary irrigation pipeline 112. The path of travel 120 of the ancillary span steering tower 118 is determined by the maneuvers required to optimize coverage within the constraints of the field-of-interest boundary 124 and the last span 130. These maneuvers are recorded within a file referred to herein as the "path.dat" which contains, by way of example only, 3,600 polar coordinates correlating the central pivot point 110 to the location of a positioning system (not shown) corresponding to the ancillary span steering tower 118. In embodiments, the ancillary span steering tower positioning system is coupled with the ancillary span steering tower 118 itself.

Figure 7:
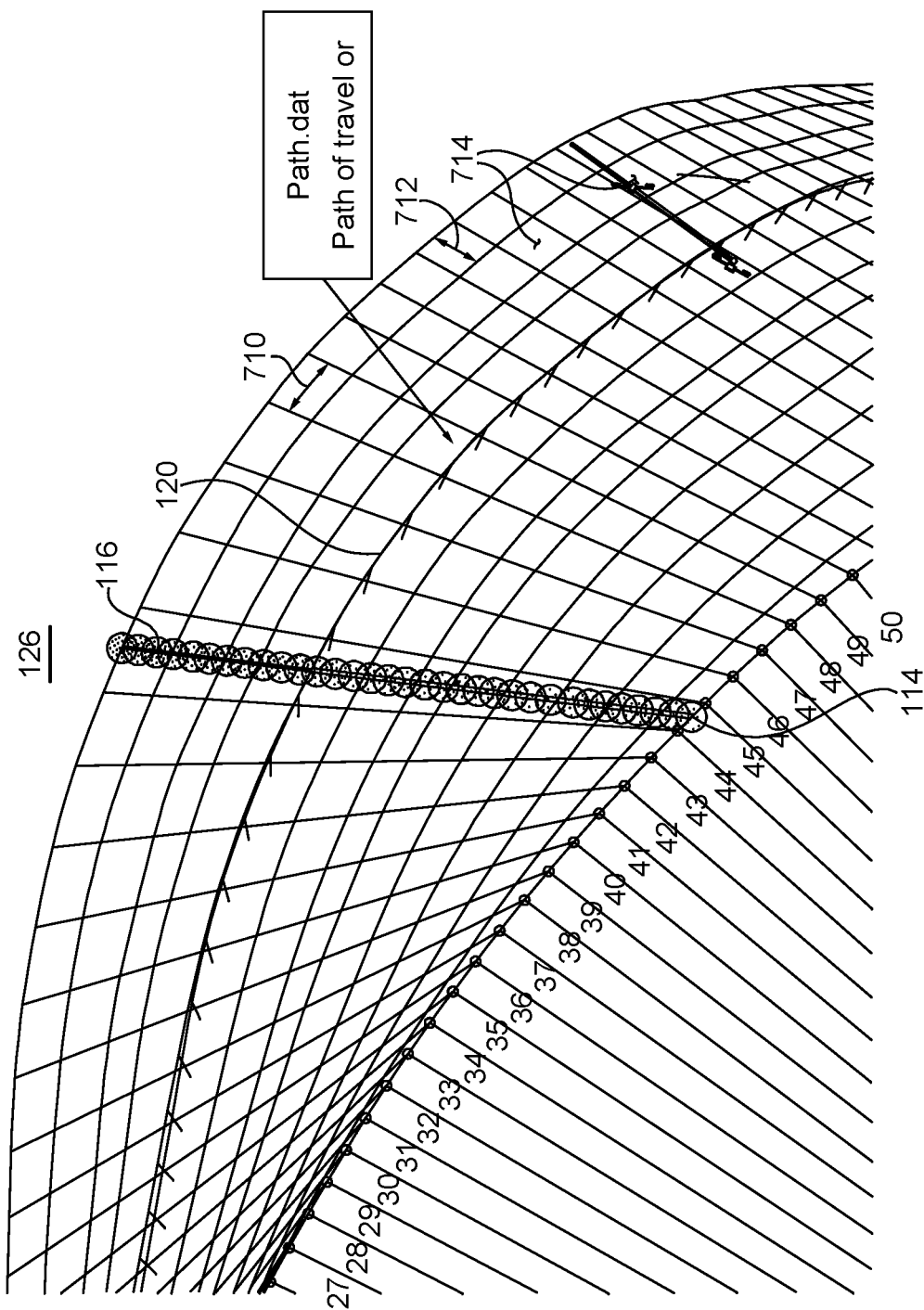
FIG. 7 is a schematic view of a portion of an area to be irrigated in accordance with an embodiment of the present disclosure.
Figure 8:
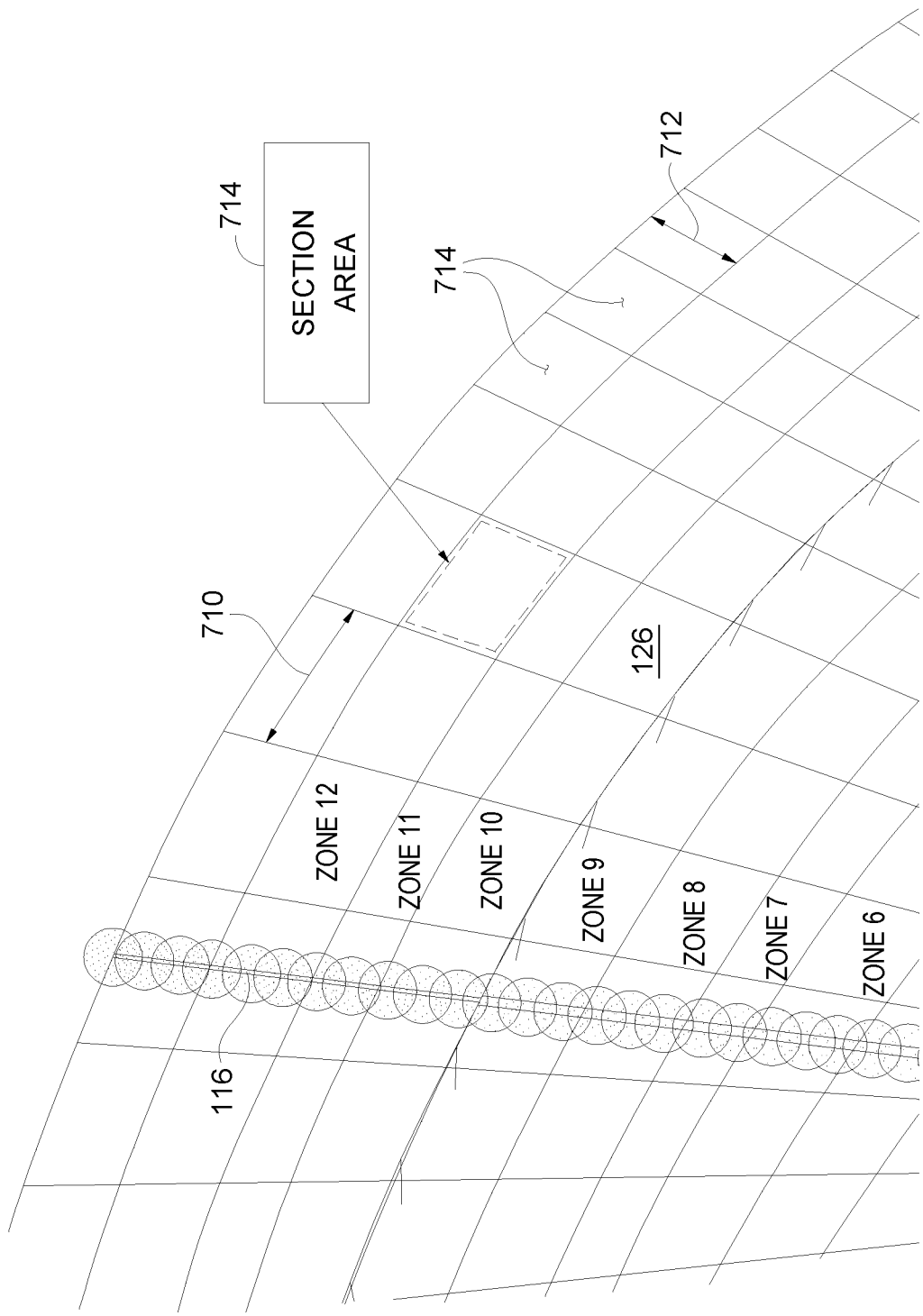
FIG. 8 is an enlarged view of a portion of FIG. 7.

Turning now to FIG. 7, a plurality of sectors 710 and a plurality of zones 712 within a portion of the field-of-interest 126 that is to be irrigated by the ancillary span are defined, the portion of the field-of-interest 126 corresponding to the path of travel 120. A "sector" 710, as the term is utilized herein, is a defined area containing a beginning angle and an ending angle corresponding to the central pivot point 110 of the irrigation system 100. For instance, a sector 710 may begin at an angle of 30 degrees relative to the central pivot point 110 and end at an angle of 30.1 degrees relative to the central pivot point 110. In this way, sectors 710 extend from the central pivot point to the field boundary. For purposes of the present disclosure, particular interest is taken of the portion of each sector that is to be irrigated by the ancillary span 116.

A "zone" 712, as the term is utilized herein, is a defined area containing a beginning distance or radius and an ending distance or radius, each distance/radius being determined based upon a distance from the central pivot point 110 of the irrigation system 100. For instance, a zone 712 may begin at 451 feet from the central pivot point 110 and end at 523 feet from the central pivot point 110. Zones 712 defined by distances closer to the central pivot point will be entirely contained within the boundary of the field and will have a circular outer perimeter. Zones 712 defined by distances further from the central pivot point will have an arcuate portion but the boundary of the field may prevent the zone from having a fully circular outer perimeter. For purposes of the present disclosure, particular interest is taken of those zones that are to be at least partially irrigated by the ancillary span 116. Zones 712 that are to be fully or partially irrigated by the ancillary span 116 may be defined similarly to the above-description, however, the distances from the central pivot point 110 that define the zones 712 will vary based upon sector 710.

Based upon the defined sectors 710 and zones 712, a plurality of sections 714 is defined within the portion of the field-of-interest 126 to be irrigated by the ancillary span 116. An exemplary section 714 is shown with reference to FIG. 8. Each section 714 exists within a corresponding zone 712 and sector 710. Each section 714 is defined by determining the angle 122 of the ancillary span 116 at the hinge point 114 relative to the parent system or primary irrigation pipeline 112 and determining a distance between the steering tower 118 of the ancillary span 116 and the central pivot point 110 at each coordinate location along the path of travel 120. Each section 714 is defined by a resultant sector 710 and zone 712 in which the steering tower 118 of the ancillary span 116 is located at each coordinate location along the path of travel 120, the steering tower 118 location being based upon the determined angle 122 of the ancillary span 116 at the hinge point 114 relative to the parent system or primary irrigation pipeline 112 and the determined distance between the steering tower 118 and the central pivot point 110. While the perimeter of each section 714 generally will form a polygon, the area of each section 714 can vary based upon the zone 712 and sector 710 defining its location.

To optimize water capacity for each section 714, the area of each section 714 is determined. In embodiments, the shoelace algorithm attributed to Gauss, as known to those having ordinary skill in the art, (or a similar method) is utilized to determine the area within each polygonal section 714. The section 714 having the largest area within each zone 712 (i.e., the "prime section") is used to determine maximum water capacity or demand required within the zone 712. Thus, by definition, the prime section within each zone 712 will require the largest water demand. Where there are multiple zones 712 within the portion of the field-of-interest 126 to be watered by the ancillary span 116, multiple prime sections will result. There can, however, only be one prime section per zone 712. In the event there is more than one section 714 within a zone 712 that have identical areas that are the largest areas in the zone 710, only one is selected to be the prime section. However, as more fully described below, the other equivalent-area section(s) 714 would also receive 100% water capacity. All other sections 714 within the zone 712 have an area less than the area of the prime section and, accordingly, variations in water capacity for those smaller area zones 712 is required. For instance, in some embodiments, there may be multiple sectors 710 within the field-of-interest 126 having widths of varying degrees (e.g., one sector width may be 10 degrees and another sector width may be 3 degrees when measured at the hinge point 114). In such embodiments, area factor percentages may be determined by dividing the area of each of the sections by the width of their corresponding sector 710 when measured at the hinge point 114. The prime section is then defined by the greatest magnitude of this quotient, not the original area.

Area factor percentages then may be determined by dividing the area of each section (or area of a section divided by the width of its sector, as appropriate) by the area of the prime section. An exemplary chart showing various area factor percentages based upon section area is illustrated in FIG. 9.

Sprinkler nozzle sizes for the ancillary span 116 are selected to satisfy the water demand for the prime section. However, if these sprinklers were to continue to operate at maximum capacity within other sections 714 throughout the zone 712, intense over-watering or oversupply of water to those sections 714 could occur. To avoid over-watering sections 714 within the zones 712 having smaller areas, area factors are determined by dividing the area of each other section 714 within the zone 712 by the area of the prime section. In this way, the water distribution within each section 714 of a zone 712 may be adjusted in accordance with its area factor, preventing overwatering of sections 714 having smaller areas.

In the illustrated embodiment of the present disclosure the area factor controls the running time of sprinkler nozzles 410 along the length of the ancillary span 116 based on the area factor percentage. For example, if the ancillary span 116 had a run time of three minutes to cross a particular section 714, the sprinklers positioned to correspond to a section 714 having an area factor percentage of 100% would be turned on for all three minutes, whereas the sprinklers corresponding to a section 714 having area factor percentage of 50% would be turned on for ninety seconds and turned off for ninety seconds. The prime section and sections with an area equal to the prime section are the only sections 714 where the sprinklers will be turned on for 100% of the time period. In all other sections 714 the sprinklers are turned off for some period of time as the ancillary span 116 crosses that section 714.

While the volume of water applied to sections 714 other than a prime section and sections equal to the prime section is controlled in the embodiment described above by turning sprinklers in a particular zone 712 off for a time period to reduce the amount of water applied to the smaller area sections (i.e., a binary, on-off water control method), other methods of reducing the volume of water applied to the section 714 may be used and still be within the scope of embodiments of the disclosure. For example, a variable volume method may be used, whereby the sprinklers are throttled down to reduce the volume of water dispensed therefrom to match the area factor percentage for that section 714. Such a method would require being able to independently control either the volume of water delivered to each sprinkler or the volume of water each sprinkler may dispense, either of which may increase complexity and cost. Additionally, reducing the volume of water applied to a sprinkler head may have the undesired effect of reducing its area of coverage. In yet a further alternate embodiment only certain sprinklers within each zone may be turned off for certain period of time to achieve the proper volume of water applied to a section based on its area factor percentage. Again, such a method may increase complexity and cost. For these reasons the binary/on-off method describe initially above may be found to be beneficial in some applications.

Figure 10:
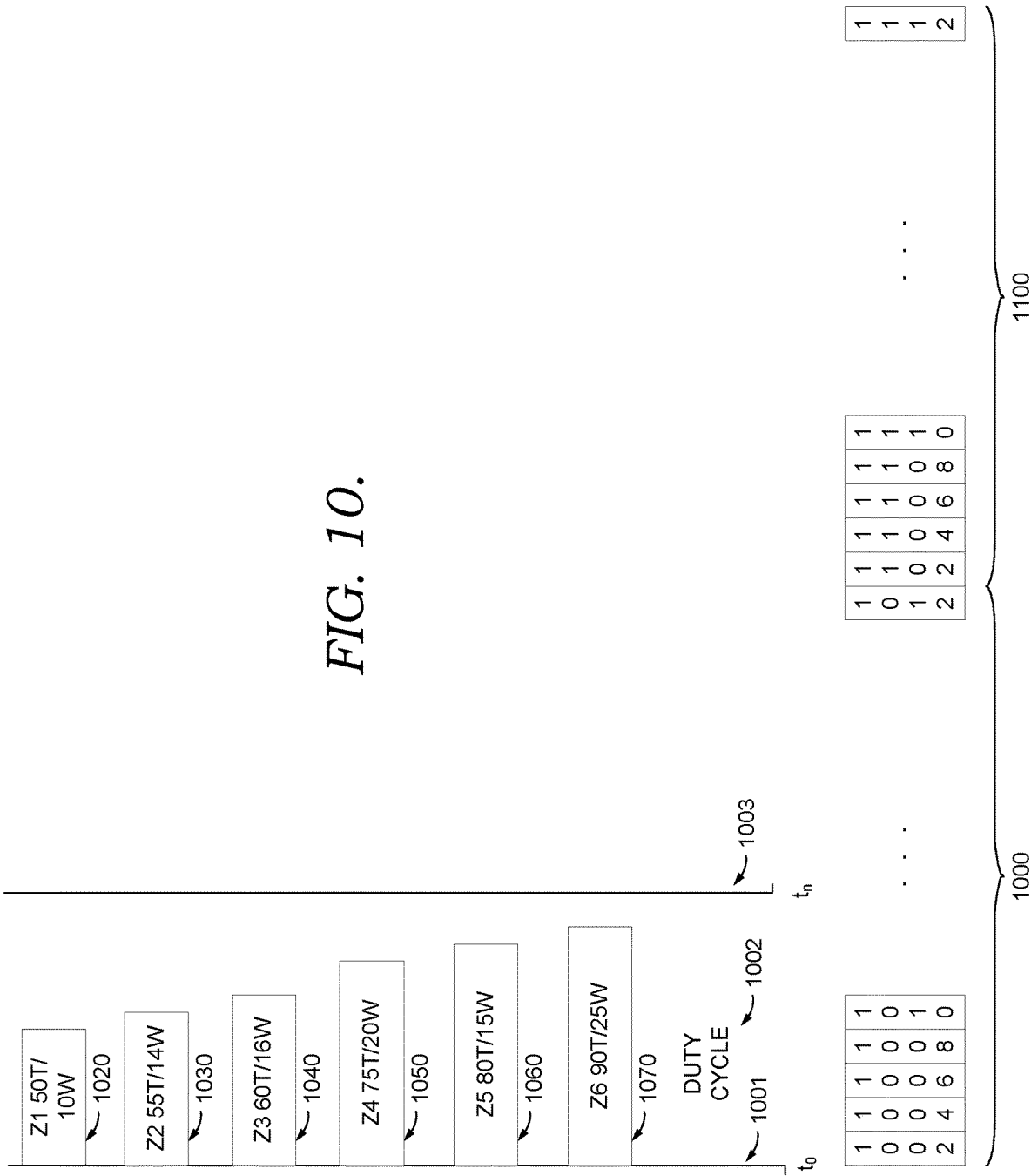
FIG. 10 shows a detailed view of a duty cycle plan that is part of a sector irrigation plan in accordance with aspects of the disclosure.

Turning now to FIG. 10, a sector irrigation plan comprising a plurality of duty cycles for six different control zones of an ancillary span are shown. As mentioned, aspects of the technology described herein can be used with any number of control zones and the use of six as an example is not meant to be limiting. The first sector irrigation plan 1000 includes a first duty cycle 1002, a second duty cycle 1004, a third duty cycle 1006, a fourth duty cycle 1008, a fifth duty cycle 1010, and a final duty cycle 1012. Multiple un-shown duty cycles may exist between the fifth duty cycle 1010 and the final duty cycle 1012. For example, a sector irrigation plan may include 30, 60, 100 or more duty cycles. Each duty cycle in a sector irrigation plan is the same duration such as two minutes, three minutes, or four minutes.

The second sector irrigation plan 1100 includes a first duty cycle 1102, a second duty cycle 1104, a third duty cycle 1106, a fourth duty cycle 1108, a fifth duty cycle 1110, and a final duty cycle 1112. Multiple un-shown duty cycles may exist between the fifth duty cycle 1110 and the final duty cycle 1112. The technology is not limited for use with any particular number of duty cycles. Aspects of the technology described herein may run simulations based on each sector irrigation plan and generate an optimal arrangement of zone irrigation times based on each sector irrigation plan.

A detail view of the first duty cycle 1002 shows that it is bounded by a start time ($t_0$) 1001 and an end time ($t_n$) 1003, where n is the duration of the duty cycle. Each box shows a control zone watering plan for the first duty cycle 1002. The length of each box across the duty cycle indicates an amount of time the control zone is to be irrigating during a duty cycle. In aspects, the runtime in the irrigation plan is expressed as a percentage of the duty cycle for which the corresponding control zone should be irrigating. In aspects, throttling the flow is not possible and the control zone is either irrigating or not irrigating. Overall, six control zone irrigation plans are shown. The technology described herein is not limited to use with irrigation equipment having six control zones.

The first control zone irrigation plan 1020 indicates that time of irrigation is 50% (50T) and that the first control zone 1020 is responsible for providing 10% (10 W) of the total amount of water output through the ancillary span while implementing the sector irrigation plan 1000. The second control zone irrigation plan 1030 indicates that time of irrigation is 55% (55T) and that the second control zone is responsible for providing 14% (14 W) of the total amount of water output through the ancillary span while implementing the sector irrigation plan 1000. The third control zone irrigation plan 1040 indicates that time of irrigation is 60% (60T) and that the third control zone is responsible for providing 16% (16 W) of the total amount of water output through the ancillary span while implementing the sector irrigation plan 1000. The fourth control zone irrigation plan 1050 indicates that time of irrigation is 75% (75T) and that the fourth control zone is responsible for providing 20% (20 W) of the total amount of water output through the ancillary span while implementing the sector irrigation plan 1000. The fifth control zone irrigation plan 1060 indicates that time of irrigation is 80% (80T) and that the fifth control zone is responsible for providing 15% (15 W) of the total amount of water output through the ancillary span while implementing the sector irrigation plan 1000. The sixth control zone irrigation plan 1070 indicates that time of irrigation is 90% (90T) and that the sixth control zone is responsible for providing 25% (25 W) of the total amount of water output through the ancillary span while implementing the sector irrigation plan 1000. Notice that duration of irrigation and total percentage of water do not always correlate. For example, the fourth control zone ran for a shorter time than the fifth control zone, but the fourth control zone contributed more total water in a shorter time frame. This is possible because different control zones may have different irrigation rates.

The arrangement of control zone irrigation plans within the detailed view of the first duty cycle 1002 is not optimal. As can be seen, the percentage of flow will vary between 100% shortly after the start 1001 and drop to 0% shortly before the end 1003. Aspects of the technology approve upon this basic arrangement, as illustrated in more detail subsequently.

Figure 11:
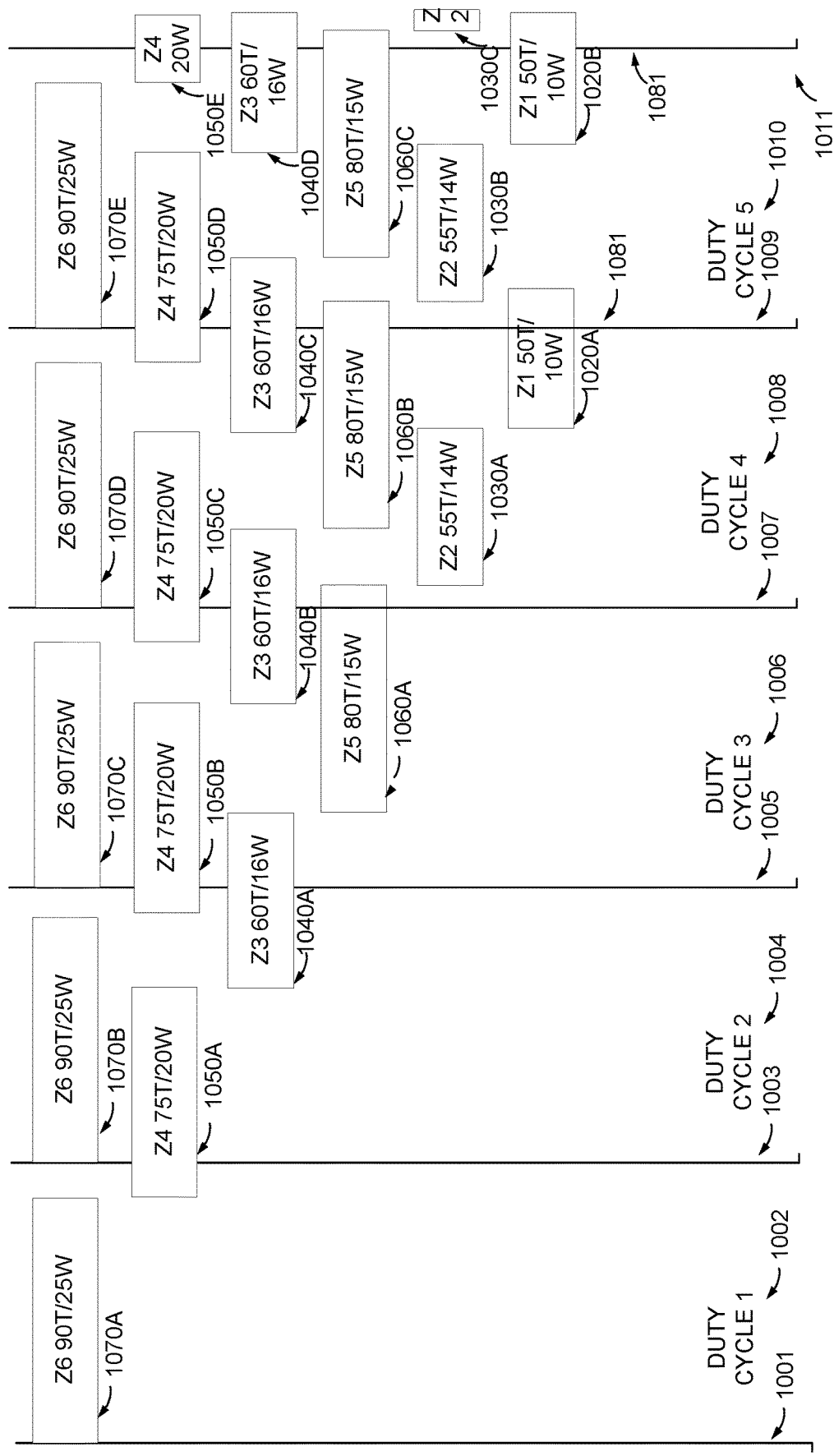
FIG. 11 shows a detailed view of a preliminary cascading irrigation plan in accordance with aspects of the disclosure.

The building of a preliminary cascading irrigation plan is shown in FIG. 11. FIG. 11 shows a detailed view of the first duty cycle 1002, the second duty cycle 1004, the third duty cycle 1006, the fourth duty cycle 1008, and the fifth duty cycle 1010. The start time of one duty cycle can be the end time of another. The names given below are with reference to the start and end of the first duty cycle 1002, the third duty cycle 1006, and fifth duty cycle 1010. The first duty cycle is bounded by start time 1001 and end time 1003. The second duty cycle 1004 is bound by end time 1003 and start time 1005. The third duty cycle 1006 is bound by start time 1005 and end time 1007. The fourth duty cycle 1008 is bound by end time 1007 and start time 1009. The fifth duty cycle 1010 is bound by start time 1009 and end time 1011. The preliminary cascading plan is a simulation that need not reflect actual irrigation that has occurred or will occur.

The cascading arrangement is a sequential arrangement of control zones where a running control zone is turned off before a subsequent control zone starts. For example, the sixth control zone plan 1070A finishes before the fourth control zone plan 1050A starts. The control zones are started in an order based on the total percentage of water applied by the ancillary span that is attributable to the control zone. Thus, the sixth control zone plan 1070A, which accounts for 25% of the total water starts first, followed by the fourth control zone plan 1050A, the third control zone plan 1040A, the fifth control zone plan 1060A, the second control zone plan 1030A, and the first control zone plan 1020A. Notice that the simulation shows that the cascading arrangement starting in the first duty cycle 1002 will not complete until the fifth duty cycle 1010. This process continues through all duty cycles in the first sector irrigation plan 1000, until the end of the final duty cycle 1012, at which point the control zone irrigation plans all stop.

The control zone irrigation plan initiates at the start of each duty cycle, but the previously started plan continues until the ancillary span crosses into a new sector, at which time a new sector irrigation plan begins. In the example shown in FIG. 11, control zone plans starting in the first duty cycle 1002 are designated with "A," control zone plans starting in the second duty cycle 1004 are designated with "B," control zone plans starting in the third duty cycle 1006 are designated with "C," control zone plans starting in the fourth duty cycle 1008 are designated with "D," and control zone plans starting in the fifth duty cycle 1010 are designated with "E." As can be seen up to five irrigation plans may be running concurrently, such as at the beginning of the fifth duty cycle 1010.

The plan stabilizes at the fifth duty cycle 1010. Every cycle after the fifth duty cycle we be identical until the final duty cycle 1012 is reached. In one aspect, the fifth duty cycle 1010 simulation is used to evaluate variance. The first step in evaluating variance is to take an instantaneous average flow at different points during the duty cycle, such as every second. The instantaneous average flow can be expressed as a percentage. For example, at time 1081, shortly after the start of the fifth duty cycle 1010, the instantaneous average flow is 86% (25+20+16+15+10). At time 1082, just before the end of the fifth duty cycle 1010, the instantaneous average flow is 75% (20+16+15+14+10).

The plurality of instantaneous average flows are used to determine a variance statistic for the plurality. Example variance statistics include, but are not limited to, range, interquartile range, standard deviation, and variance. As an example, a small standard deviation will indicate low variability, while a comparatively large standard deviation will indicate high variability among the data set.

In one aspect, an acceptance threshold is used to determine whether to simulate more arrangements or accept a present simulation. If the variance statistic calculated for a simulation's instantaneous average flows meets an acceptance threshold, then the preliminary cascading arrangement may be accepted as the final sector irrigation model and no further simulations run. On the other hand, if the variance statistic does not satisfy the acceptance threshold then additional simulations are run until a simulation is found that satisfies the acceptance threshold. If no simulation produces an arrangement that meets the acceptance threshold then the simulation that produces the best variance statistic may be accepted. Alternatively, no acceptance threshold is run and all available models are simulated to find the model with the least variance, as measured by a variance statistic.

Figure 12:
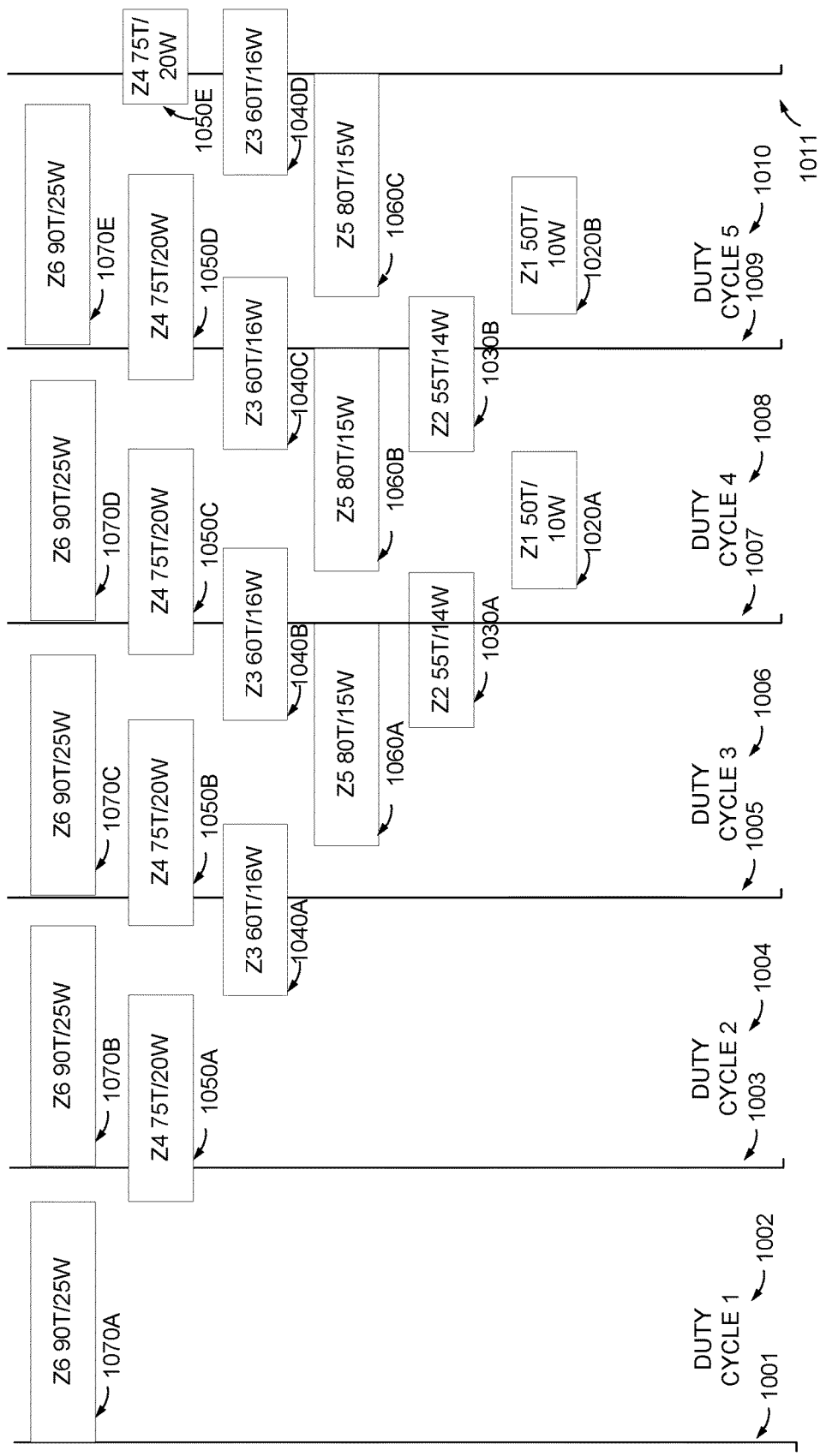
FIG. 12 shows a detailed view of a low water reversal model in accordance with aspects of the disclosure.

A low water reversal model is depicted in FIG. 12. The duty cycles and zone control plans are all the same as described previously with reference to FIG. 11, except the first control zone plan 1020A is reversed. A reversed plan is arranged to end at the end of the duty cycle instead of after the previous control plan ends. In this example, the first control zone plan 1020A ends at the same time as the duty cycle boundary 1009. In contrast, the first control zone plan 1020A started after the second control zone plan 1030A ended in FIG. 11. The low water reversal model reverses the arrangement of the control zone plan accounting for the lowest percentage of overall water used within the sector irrigation plan. In this case, the first control zone plan 1020A accounts for the lowest percentage of overall water use at 10%. Notice that the low water reversal model stabilizes in the fourth duty cycle 1008. Thus, the fourth duty cycle 1008 could be used to evaluate the variance within the low water reversal model simulation.

Figure 13:
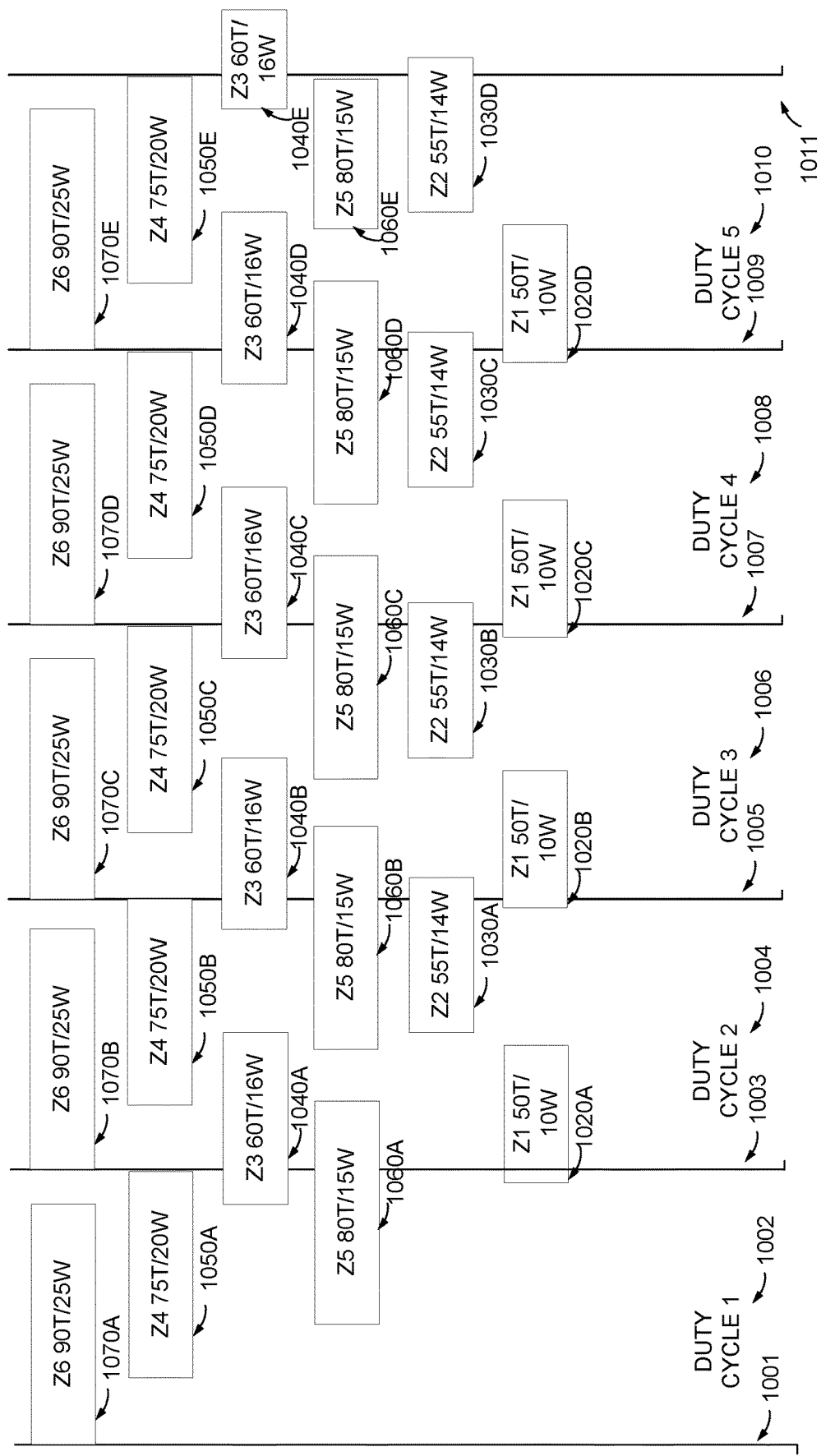
FIG. 13 shows a detailed view of an even numbered control zone reversal model in accordance with aspects of the disclosure.

FIG. 13 shows an even numbered zone reversal model in accordance with aspects of the disclosure. The duty cycles and zone control plans are all the same as described previously with reference to FIG. 11, except the controls plans with the second most water percentage, fourth most water percentage and sixth most water percentage are reversed. In this case, the fourth control zone plan 1050A (second most at 20 W), the fifth control zone plan 1060A (fourth most 15 W) and the first control zone plan 1020A (sixth most) are reversed. The first plan in the reversed plan is arranged to end at the end of the duty cycle. The subsequent reversed plans end at the start of the previously reversed plan. Essentially, the reversed plans progress sequentially towards the start of the duty cycle. In this example, the fourth control zone plan 1050A ends at the same time as the first duty cycle. The subsequent reversed plan (the fifth control zone plan 1060A) then ends at the start of the initially reversed plan (fourth control zone plan 1050A). the The first control zone plan 1020A follows the pattern by ending at the start of the fourth control zone plan 1050A. Notice that the even numbered zone reversal model stabilizes in the second duty cycle 1004. Thus, the second duty cycle 1006 could be used to evaluate the variance within the even numbered zone reversal model simulation.

Figure 14:
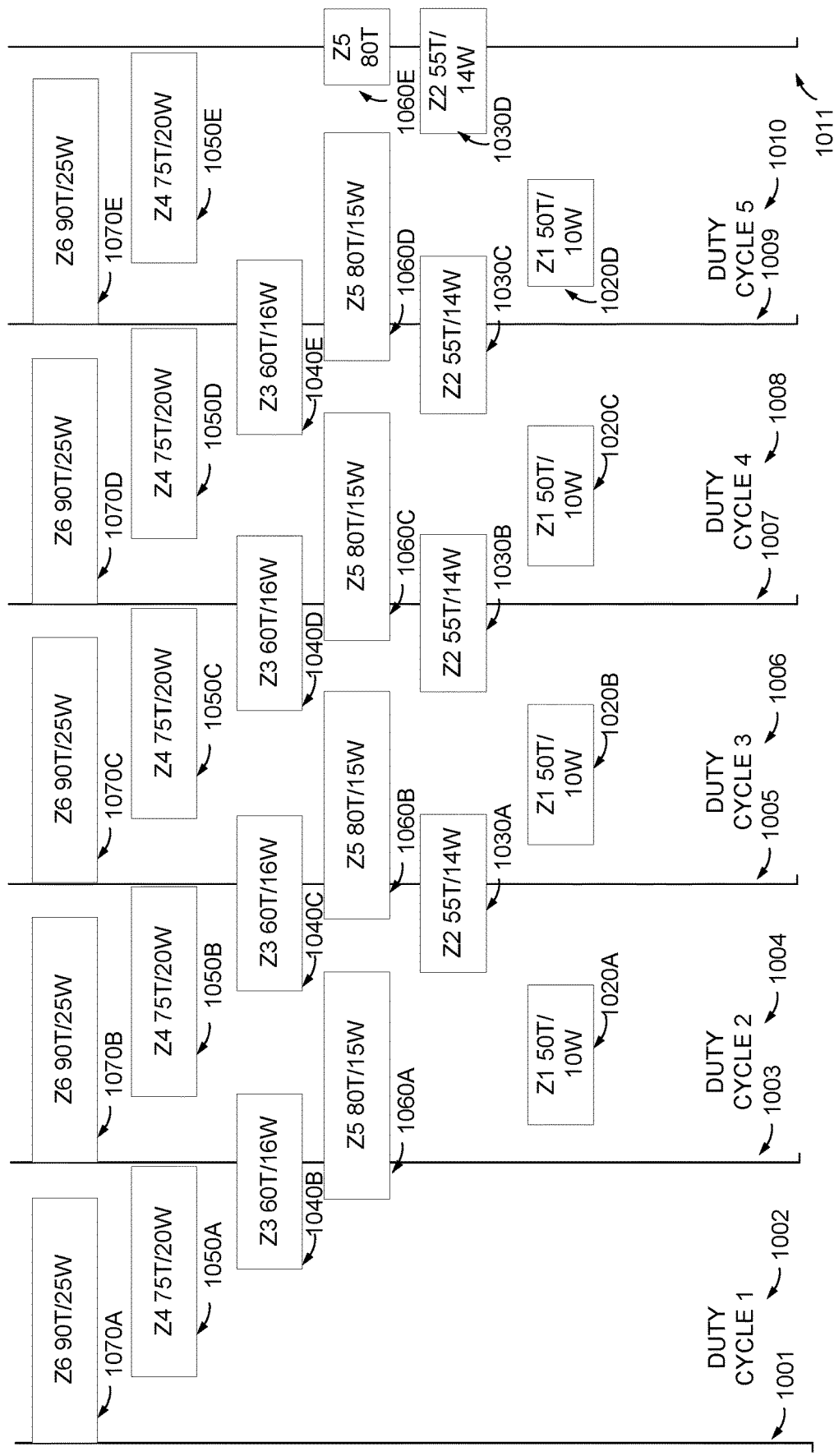
FIG. 14 shows a detailed view of an second control zone, third control zone, and sixth control zone reversal model in accordance with aspects of the disclosure.

FIG. 14 shows a second control zone, third control zone, and sixth control zone reversal model in accordance with aspects of the disclosure. The duty cycles and zone control plans are all the same as described previously with reference to FIG. 11, except the controls plans with the second most water percentage, third most water percentage and sixth most water percentage are reversed. In this case, the fourth control zone plan 1050A (second most at 20 W), the third control zone plan 1040A (third most 16 W) and the first control zone plan 1020A (sixth most) are reversed. The first plan in the reversed plan is arranged to end at the end of the duty cycle. The subsequent reversed plans end at the start of the previously reversed plan. Essentially, the reversed plans progress sequentially towards the start of the duty cycle. Notice that the even reversal model of FIG. 14 stabilizes in the third duty cycle 1006. Thus, the third duty cycle 1006 could be used to evaluate the variance within the even numbered zone reversal model simulation.

Though not depicted in a figure, preliminary plans simulated through the above modes may go through one or more rule-based evaluations looking for problem planning points, such as two or more control zone plans ending at the same or starting at the same time. The problem planning points may be evaluated by comparing the preliminary plans against a plurality of rules. When a plan matches a rule, then a rule based adjustment may be made. For example, one of two control zones ending at the same time may be nudged forward in the cycle or backwards in the cycle a few seconds within the simulation. Similarly, one of two control zones starting at the same time may be nudged forward or backwards a few seconds. In either case, two rule-adjusted plans may emerge for further evaluation and replace the original plan that had the planning problem point. The two new rule adjusted plans can be described as a nudged-forward plan and a nudged-backwards plan. The two new rule adjusted plans may go through the same rule evaluation to determine if the new plan violates the same or different rules. If a plan passes the rule-based evaluations, then it can proceed to analysis, such as a variance calculation.

As an alternative, rules can be evaluated as the model is built. As each new control zone plan is added to the model, the model can be evaluated against the rules. When a rule (e.g., two zones start at the same time) is violated then the control zone plan can be nudged forward and then backwards. The variance or some other measure can be calculated at that time to compare the partially complete plan (e.g., nudged forward arrangement vs. nudged backward arrangement). The forward or backward nudged control zone plan arrangement can then be selected for inclusion based on the result of the variance measured in the partially complete plan.

An alternative form of reversal, is to end each reversed control zone plan at the end of the duty cycle, except that one or more of the plans ending at the duty cycle are nudged forward or backward to avoid having multiple plans end at the same time (i.e., at the end of the duty cycle). Thus, as an alternative to the even number reversal in FIG. 13, the fourth control zone plan 1050A (second most at 20 W), the fifth control zone plan 1060A (fourth most 15 W) and the first control zone plan 1020A (sixth most) could all end at the end of the first duty cycle, except that the start of the fifth control zone plan 1060A is nudged backward two seconds and the start of the first control zone plan 1020A is nudged backward four seconds.

Though not depicted in a figure, a start-end time model adjusts any of the previously described models if a filter identifies short duration, high output instantaneous average flow periods near the end or start of a control zone plan. Each criteria in the filter may be specified. For example, high output may be above average flow percentage. Short duration may be less than 20 seconds and near the start or end of a control zone plan may be 20 seconds. For the control zone to be considered it must be on and contributing to the high output. Control zones that are not irrigating during the high output period are not considered because the goal is to move the start of a control zone contributing to the high output so that it is not irrigating during the original high output time, thus lowering the high output. If all filter criteria are met, then the start time of the control zone plan that ends within 20 seconds (as an example) is adjusted to start a time period forward (e.g., 20 seconds later) to form a forward adjusted plan and then backwards (e.g., 20 seconds earlier) to form a backwards adjusted plan. The forward adjusted plan and backward adjusted plan are then evaluated to see if an improvement results.

In one aspect, intersectional reversals can be evaluated as alternate versions of any of the previously described plans. An intersectional reversal is the moving of a control zone plan that intersects a duty cycle boundary to the start or end of a duty cycle. For example, a control zone plan that intersected a duty cycle boundary line could be moved to start at the beginning of the duty cycle delineated by the duty cycle boundary line that was originally intersected. This alternate arrangement can be evaluated against other arrangements.

From all of the above described plans, the plan producing the least variance may be selected and implemented.

Figure 15:
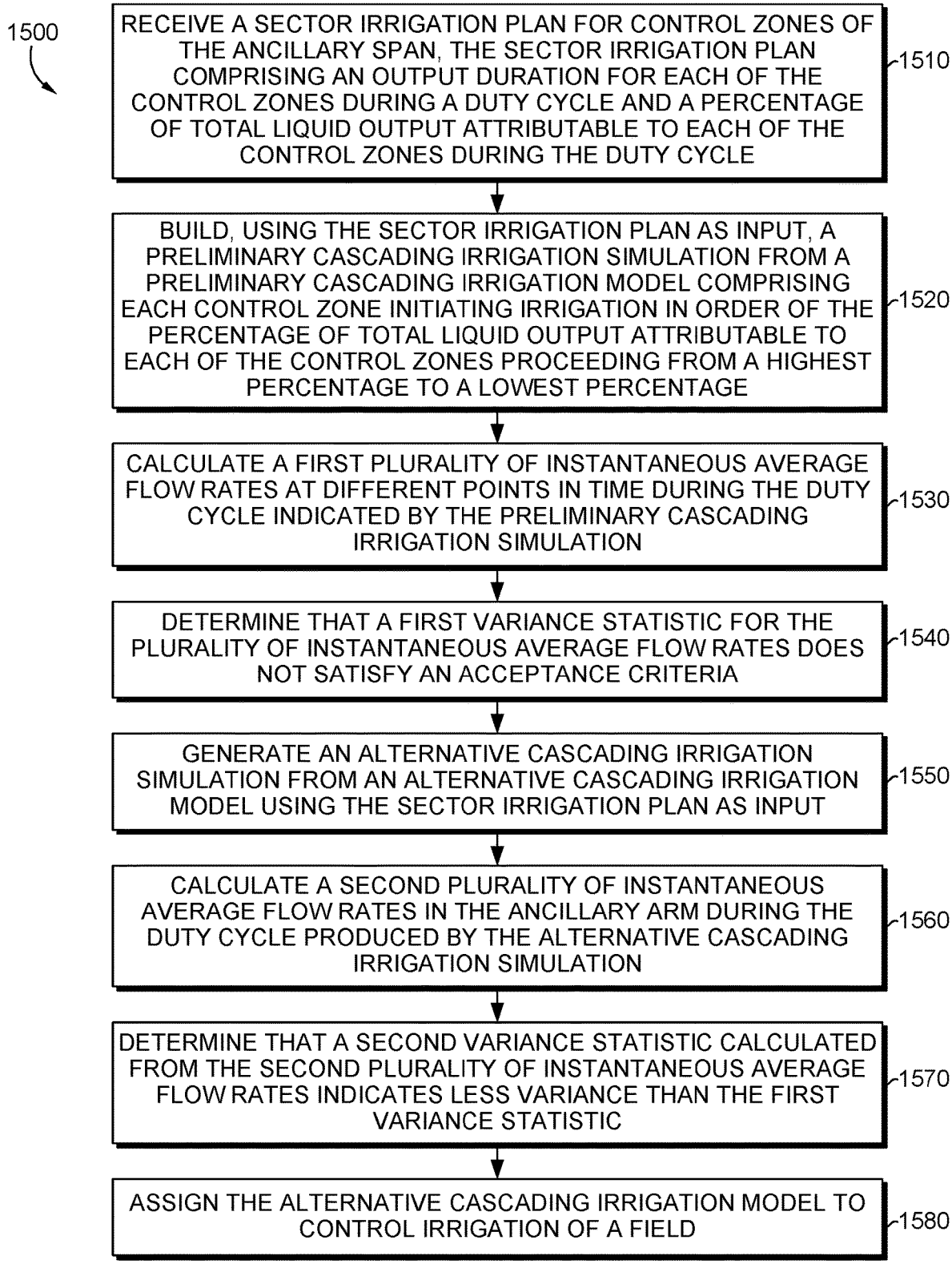
FIG. 15 is a flow diagram of a method of determining an optimal irrigation plan for a sector to be irrigated by an ancillary span of an irrigation system in accordance with an embodiment of the disclosure.

Turning now to FIG. 15, a method 1500 of controlling water flow through zones of an ancillary span of an irrigation system, the irrigation system having a central pivot point about which a primary irrigation pipeline swivels and having a hinge point at which the ancillary span is coupled with the primary irrigation pipeline is provided. The method comprising, at step 1510, receiving a sector irrigation plan for a plurality of control zones of the ancillary span. The irrigation plan comprising an output duration for each of the control zones during a duty cycle and a percentage of total liquid output attributable to each of the control zones during the duty cycle.

The method 1500 comprising at step 1520, building, using the irrigation plan as input, a preliminary cascading irrigation simulation from a preliminary cascading irrigation model comprising each control zone initiating irrigation in order of the percentage of total liquid output attributable to each of the control zones proceeding from a highest percentage to a lowest percentage. Within the preliminary cascading irrigation model a subsequently scheduled control zone starts after a preceding control zone stops.

The method 1500 comprising at step 1530, calculating a first plurality of instantaneous average flow rates at different points in time during the duty cycle indicated by the preliminary cascading irrigation simulation.

The method 1500 comprising at step 1540, determining that a first variance statistic for the plurality of instantaneous average flow rates does not satisfy an acceptance criteria.

The method 1500 comprising at step 1550, generating an alternative cascading irrigation simulation from an alternative cascading irrigation model using the irrigation plan as input.

The method 1500 comprising at step 1560, calculating a second plurality of instantaneous average flow rates in the ancillary span during the duty cycle produced by the alternative cascading irrigation simulation.

The method 1500 comprising at step 1570, determining that a second variance statistic calculated from the second plurality of instantaneous average flow rates indicates less variance than the first variance statistic.

The method 1500 comprising at step 1580, assigning the alternative cascading irrigation model to control irrigation of a field.

Additionally, although some exemplary implementations of the embodiments described herein are shown in the accompanying figures, these implementations are not intended to be limiting. Rather, it should be understood that the various embodiments and aspects described herein may be implemented upon any number of irrigation systems. It is within the scope of the present disclosure that the above principals could be equally applied in other settings.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

Aspects of the disclosure have been described to be illustrative rather than restrictive. It will be understood that certain features and sub-combinations are of utility and may be employed without reference to other features and sub-combinations. This is contemplated by and is within the scope of the claims.

What is claimed is:

1. A method of controlling water flow through zones of an ancillary span of an irrigation system, the irrigation system having a central pivot point about which a primary irrigation pipeline swivels and having a hinge point at which the ancillary span is coupled with the primary irrigation pipeline, the method comprising:
    receiving a sector irrigation plan for control zones of the ancillary span, the sector irrigation plan comprising an output duration for each of the control zones during a duty cycle and a percentage of total liquid output attributable to each of the control zones during the duty cycle;
    building, using the sector irrigation plan as input, a preliminary cascading irrigation simulation from a preliminary cascading irrigation model comprising each control zone initiating irrigation in order of the percentage of total liquid output attributable to each of the control zones proceeding from a highest percentage to a lowest percentage, wherein within the preliminary cascading irrigation model a subsequently scheduled control zone starts after a preceding control zone stops;
    calculating a first plurality of instantaneous average flow rates at different points in time during the duty cycle indicated by the preliminary cascading irrigation simulation;
    determining that a first variance statistic for the plurality of instantaneous average flow rates does not satisfy an acceptance criteria;
    generating an alternative cascading irrigation simulation from an alternative cascading irrigation model using the sector irrigation plan as input;
    calculating a second plurality of instantaneous average flow rates in the ancillary span during the duty cycle produced by the alternative cascading irrigation simulation;
    determining that a second variance statistic calculated from the second plurality of instantaneous average flow rates indicates less variance than the first variance statistic; and
    assigning the alternative cascading irrigation model to control irrigation of a field.

2. The method of claim 1, wherein the alternative cascading irrigation model is a single reverse plan comprising altering the preliminary cascading irrigation model by reversing a single control zone, wherein reversing is starting a reversed control zone at a time that causes the reversed control zone to stop simultaneously with a preceding control zone.

3. The method of claim 2, wherein the single control zone has a least percentage of total liquid output attributable to the single control zone during the duty cycle.

4. The method of claim 1, wherein the alternative cascading irrigation model is a 50 percentage reverse plan comprising altering the preliminary cascading irrigation model by reversing half of the control zones in the ancillary span, wherein reversing is starting a reversed control zone at a time that causes the reversed control zone to stop simultaneously with a preceding control zone.

5. The method of claim 4, wherein the half of the control zones are every other control zone based on percentage of total liquid output attributable to the control zones during the duty cycle.

6. The method of claim 1, wherein the alternative cascading irrigation model is a third percentage reverse model comprising altering the preliminary cascading irrigation simulation by reversing a third of the control zones in the ancillary span, wherein reversing is starting a reversed control zone at a time that causes the reversed control zone to stop simultaneously with a preceding control zone.

7. The method of claim 1, wherein the alternative cascading irrigation model is a backwards adjusted model formed by starting a single control zone in the ancillary span a time threshold earlier than in the preliminary cascading irrigation simulation.

8. The method of claim 1, wherein the alternative cascading irrigation model is a forwards adjusted model formed by starting a single control zone in the ancillary span a time threshold later than in the preliminary cascading irrigation simulation.

9. A method of controlling water flow through zones of an ancillary span of an irrigation system, the irrigation system having a central pivot point about which a primary irrigation pipeline swivels and having a hinge point at which the ancillary span is coupled with the primary irrigation pipeline, the method comprising:
receiving a sector irrigation plan for control zones of the ancillary span, the sector irrigation plan comprising an output duration for each of the control zones during a duty cycle and a percentage of total liquid output attributable to each of the control zones during the duty cycle;
building, using the sector irrigation plan as input, a preliminary cascading irrigation simulation from a preliminary cascading irrigation model comprising each control zone initiating irrigation in order of the percentage of total liquid output attributable to each of the control zones proceeding from a highest percentage to a lowest percentage, wherein within the preliminary cascading irrigation model a subsequently scheduled control zone starts after a preceding control zone stops;
generating an alternative cascading irrigation simulation from an alternative cascading irrigation model using the sector irrigation plan as input;
determining that the alternative cascading irrigation simulation indicates less flow variance than the preliminary cascading irrigation simulation; and
assigning the alternative cascading irrigation model to control irrigation of a field.

10. The method of claim 9, wherein the alternative cascading irrigation model is a single reverse plan comprising altering the preliminary cascading irrigation model by reversing a single control zone, wherein reversing is starting a reversed control zone at a time that causes the reversed control zone to stop simultaneously with a preceding control zone.

11. The method of claim 10, wherein the single control zone has a least percentage of total liquid output attributable to the single control zone during the duty cycle.

12. The method of claim 9, wherein the alternative cascading irrigation model is a 50 percentage reverse plan comprising altering the preliminary cascading irrigation model by reversing half of the control zones in the ancillary span, wherein reversing is starting a reversed control zone at a time that causes the reversed control zone to stop simultaneously with a preceding control zone.

13. The method of claim 12, wherein the half of the control zones are every other control zone based on percentage of total liquid output attributable to the control zones during the duty cycle.

14. The method of claim 9, wherein the alternative cascading irrigation model is a third percentage reverse model comprising altering the preliminary cascading irrigation simulation by reversing a third of the control zones in the ancillary span, wherein reversing is starting a reversed control zone at a time that causes the reversed control zone to stop simultaneously with a preceding control zone.

15. The method of claim 9, wherein the alternative cascading irrigation model is a backwards adjusted model formed by starting a single control zone in the ancillary span a time threshold earlier than in the preliminary cascading irrigation simulation.

16. The method of claim 9, wherein the alternative cascading irrigation model is a forwards adjusted model formed by starting a single control zone in the ancillary span a time threshold later than in the preliminary cascading irrigation simulation.

17. A method of controlling water flow through zones of an ancillary span of an irrigation system, the irrigation system having a central pivot point about which a primary irrigation pipeline swivels and having a hinge point at which the ancillary span is coupled with the primary irrigation pipeline, the method comprising:
receiving a sector irrigation plan for control zones of the ancillary span, the sector irrigation plan comprising an output duration for each of the control zones during a duty cycle and a percentage of total liquid output attributable to each of the control zones during the duty cycle;
building, using the sector irrigation plan as input, a preliminary cascading irrigation simulation from a preliminary cascading irrigation model comprising each control zone initiating irrigation in order of the percentage of total liquid output attributable to each of the control zones proceeding from a highest percentage to a lowest percentage, wherein within the preliminary cascading irrigation model a subsequently scheduled control zone starts after a preceding control zone stops;
generating a first alternative cascading irrigation simulation from a first alternative cascading irrigation model using the sector irrigation plan as input;
generating a second alternative cascading irrigation simulation from a second alternative cascading irrigation model using the sector irrigation plan as input;

generating a third alternative cascading irrigation simulation from a third alternative cascading irrigation model using the sector irrigation plan as input;

determining that the first alternative cascading irrigation simulation indicates less flow variance than the preliminary cascading irrigation simulation, the second alternative cascading irrigation simulation, and the third alternative cascading irrigation simulation; and assigning the first alternative cascading irrigation model to control irrigation of a field.

18. The method of claim 17, wherein the first alternative cascading irrigation model is a single reverse plan comprising altering the preliminary cascading irrigation model by reversing a single control zone, wherein reversing is starting a reversed control zone at a time that causes the reversed control zone to stop simultaneously with a preceding control zone.

19. The method of claim 17, wherein the second alternative cascading irrigation model is a 50 percentage reverse plan comprising altering the preliminary cascading irrigation model by reversing half of the control zones in the ancillary span, wherein reversing is starting a reversed control zone at a time that causes the reversed control zone to stop simultaneously with a preceding control zone.

20. The method of claim 17, wherein the third alternative cascading irrigation model is a third percentage reverse model comprising altering the preliminary cascading irrigation simulation by reversing a third of the control zones in the ancillary span, wherein reversing is starting a reversed control zone at a time that causes the reversed control zone to stop simultaneously with a preceding control zone.

\* \* \* \* \*